US009529696B2

(12) United States Patent
Johnson et al.

(10) Patent No.: US 9,529,696 B2
(45) Date of Patent: Dec. 27, 2016

(54) SCREEN BOUNDS FOR VIEW DEBUGGING

(71) Applicant: Apple Inc., Cupertino, CA (US)

(72) Inventors: Godwin Johnson, Cupertino, CA (US); Ken Orr, Cupertino, CA (US); Behzad Aghaei, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 14/291,870

(22) Filed: May 30, 2014

(65) Prior Publication Data

US 2015/0346982 A1 Dec. 3, 2015

(51) Int. Cl.

*G06F 3/048* (2013.01)
*G06F 11/36* (2006.01)
*G06F 3/0481* (2013.01)

(52) U.S. Cl.

CPC ....... *G06F 11/3664* (2013.01); *G06F 3/04815* (2013.01)

(58) Field of Classification Search

CPC .............. G06F 3/04847; G06F 3/04815; G06F 11/3664
USPC ................................ 715/762, 763, 243, 244
See application file for complete search history.

(56) References Cited

U.S. PATENT DOCUMENTS 7,142,225 B1 * 11/2006 Boler ...................... G06T 11/60 345/566
7,557,804 B1 7/2009 McDaniel
7,777,730 B2 8/2010 Geurts et al.
8,024,667 B2 * 9/2011 Shaw .................... G06F 3/0481 715/243
8,065,603 B2 11/2011 Gossweiler, III et al.
8,300,055 B2 10/2012 Niles et al.
8,314,790 B1 11/2012 Zeiger et al.
8,416,205 B2 4/2013 Rapp et al.
8,576,223 B1 11/2013 Kogan
(Continued)

FOREIGN PATENT DOCUMENTS

WO WO-2013169875 A2 11/2013

OTHER PUBLICATIONS

"mixedCase—Review roundup: IOS debug tools and inspectors", [online]. [retrieved on Apr. 28, 2014]. received from the Internet: <URL: http://www.mixedcase.nl/articles/2013/06/04/review-ios-debuggers/>, (2013), 5 pgs.

*Primary Examiner* — Andrey Belousov
(74) *Attorney, Agent, or Firm* — Blakely, Sokoloff, Taylor & Zafman LLP

(57) ABSTRACT

A visual debugger provides a three-dimensional view of a user interface of an application. The application's user interface is built from a hierarchy of view objects. The hierarchy of view objects can be displayed as a three-dimensional representation of the view. A set of layers is created, with each layer corresponding to a level in the hierarchy of view objects. The display device on which the application runs has a view area in which the user interface ("UI") of the application can be displayed. The visual debugger presents a visual representation of the view area for the UI to the application developer. The view bounds are shown as an outline on one or more layers of the three-dimensional representation of the view. Objects outside of the view bounds are highlighted. The visual debugger allows the application developer to select the layer or layers on which the outline appears.

22 Claims, 13 Drawing Sheets

(56) References Cited

U.S. PATENT DOCUMENTS

2012/0030569 A1 2/2012 Migos

* cited by examiner

SCREEN BOUNDS FOR VIEW DEBUGGING

TECHNICAL FIELD

This application relates generally to data processing, and more specifically to systems and methods for screen bounds for view debugging.

BACKGROUND

A programmer can use a visual debugger to examine a user interface created by an application. The application may be running on the same computer being used for debugging, or on a separate device.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DEFINITIONS

Figure 1:
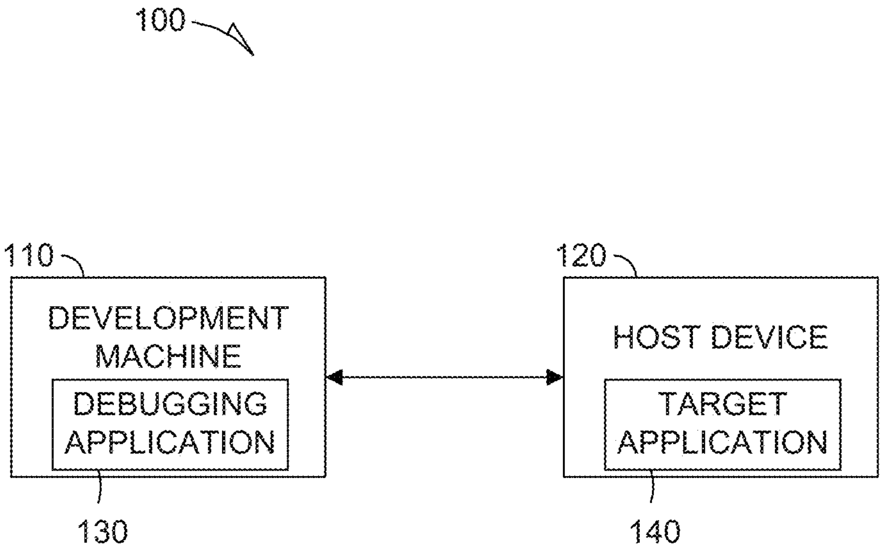
FIG. 1 is a block diagram depicting a system for view debugging, according to an example embodiment.

As used herein, a "database" is a data storage resource and may store data structured as a text file, a table, a spreadsheet, a relational database (e.g., an object-relational database), a triple store, a hierarchical data store, or any suitable combination thereof.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

An application developer uses a debugger to investigate the functioning of an application and determine if it is functioning properly. A visual debugger provides visual tools to help the application developer find errors ("bugs") in the application. One visual tool that may be provided by a visual debugger is a three-dimensional view of a user interface of the application.

User interface development tools may provide an application developer with the ability to assemble a variety of different views or screens of information for presentation to a user. An individual view may include a variety of different objects or elements, some of which may be layered or stacked on top of each other in completely or partially overlapping configurations. The management, organization, and manipulation of different views and their constituent objects or elements may become cumbersome to manipulate if the design of a view includes more than a small number of elements. Additionally, interacting with multiple objects that are distributed among overlapping layers may not be intuitive when presented in a two dimensional interface.

An application's user interface may be built from a hierarchy of view objects. For example, a root object for a view can have members indicating the position and dimensions of the view. The root object can also have a list of child objects appearing in the view. The child objects can also have positions, dimensions, and further child objects.

The hierarchy of view objects can be displayed as a three-dimensional representation of the view. For example, a set of layers can be created, with each layer corresponding to a level in the hierarchy of view objects. The rear-most layer can represent the view object, the next layer can represent objects that are directly referenced by the view object, the layer after that can represent the child objects of the directly-referenced objects, and so on.

The display device on which the application runs may have a view area in which the user interface ("UI") of the application can be displayed. For example, a device may have a screen size of 1136 by 640 pixels. An application may run in a full-screen mode and have access to the entire screen area to present the UI. Alternatively, the device, the application, or the operating system ("OS") may limit the available screen area to a smaller region or virtually extend to the screen to a larger size. For example, the application may be displayed in a window having an adjustable size. The view area can correspond to a current size of the window, a default size of the window, or an application- or OS-defined maximum or minimum size of the window.

The visual debugger can present a visual representation of the view area for the UI to the application developer. For example, the view bounds can be shown as an outline on one or more layers of the three-dimensional representation of the view. Objects outside of the view bounds can be highlighted. The highlighting of out-of-bounds objects may facilitate the detection by the application developer of objects that will not be displayed to an end-user of the application.

The visual debugger may allow the application developer to select the layer or layers on which the outline appears. For example, the application developer may be enabled to click on or touch a layer to select that layer. As another example, the application developer may be enabled to drag the boundary or a slider connected to the boundary to move the boundary through multiple layers in a single command.

Example System

FIG. 1 is a network diagram depicting a network 100, within which one example embodiment can be deployed. The network 100 includes a development machine 110 and a host device 120, communicating via a direct connection such as a universal serial bus ("USB") or Bluetooth connection, or via an indirect connection such as a local-area network ("LAN") or the Internet. In some example embodiments, the development machine 110 and the host device 120 are the same device.

The development machine 110 runs a debugging application 130. The target application 140 may run on the host device 120. The debugging application 130 accesses the target application 140 to provide debugging information to an application developer. For example, the target application 140 may be running on the host device 120. The debugging application 130 may have access to the source code for the target application 140 and the memory of the host device 120. Based on the source code for the target application 140 and the memory of the host device 120, current values for variables, structures, and classes described in the source code of the target application 140 can be determined. The debugging application 130 can present these values to the application developer. Among the values that may be accessed by the debugging application are values corresponding to the UI of the target application 140.

Example Modules

Figure 2:
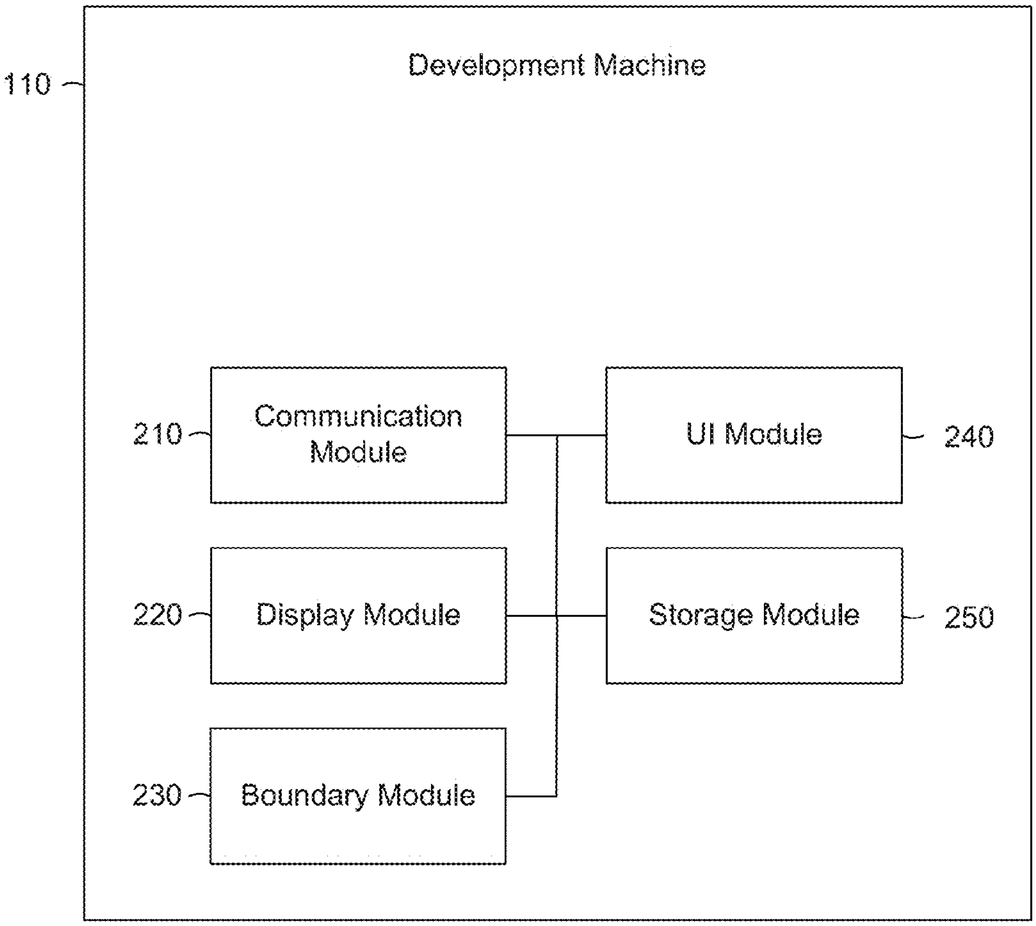
FIG. 2 is a block diagram illustrating a development machine for view debugging, according to an example embodiment.

FIG. 2 is a block diagram illustrating modules 210-250 of a development machine 110 suitable for view debugging, according to an example embodiment. The development machine 110 is shown as including a communication module 210, a display module 220, a boundary module 230, a user interface ("UI") module 240, and a storage module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 sends data to and receives data from the host device 120. For example, the development machine 110 and the host device 120 may communicate via a direct connection (e.g., a serial connection such as universal serial bus ("USB") or a parallel connection such as that defined by the IEEE 1284 standard). As another example, the development machine 110 and the host device 120 may communicate indirectly, via a network 100 such as a local-area network ("LAN"), a wide-area network ("WAN"), or the Internet.

The communication module 210 interacts with the other modules 220-250 of the development machine 110 by acting as an intermediary for communication. For example, boundary module 230 may seek information from the host device 120 regarding the display bounds of the device. Accordingly, the boundary module 230 may instruct the communication module 210 to make an appropriate request to the host device 120 for the desired information.

The display module 220 causes the display of a three-dimensional representation of the UI of an application. Data needed by the display module 220 may be retrieved from the storage module 250 or from the host device 120 via the communication module 210.

The boundary module 230 detects component objects of the UI of the application that are outside of the display boundary of the application. Data needed by the display module 220 may be retrieved from the storage module 250 or from the host device 120 via the communication module 210.

The UI module 240 presents a UI to the application developer. The application developer can interact with the UI to control the visual debugger. For example, the UI may include buttons, sliders, drop-down menus, text input fields, selectors, and other UI elements.

The storage module 250 stores data for access by the other modules 210-240. For example, data structures used to generate the UI of the application being debugged can be stored by the storage module 250 for use by the display module 220 in displaying a three-dimensional representation of the UI. Similarly, those data structures, along with data regarding the boundaries of the UI, can accessed from the storage module 250 by the boundary module 230 for use in determining which objects in the UI extend outside the UI boundaries.

Additional details regarding the functionality provided by the modules 210-250 are detailed below in reference to FIGS. 9-12.

Figure 3:
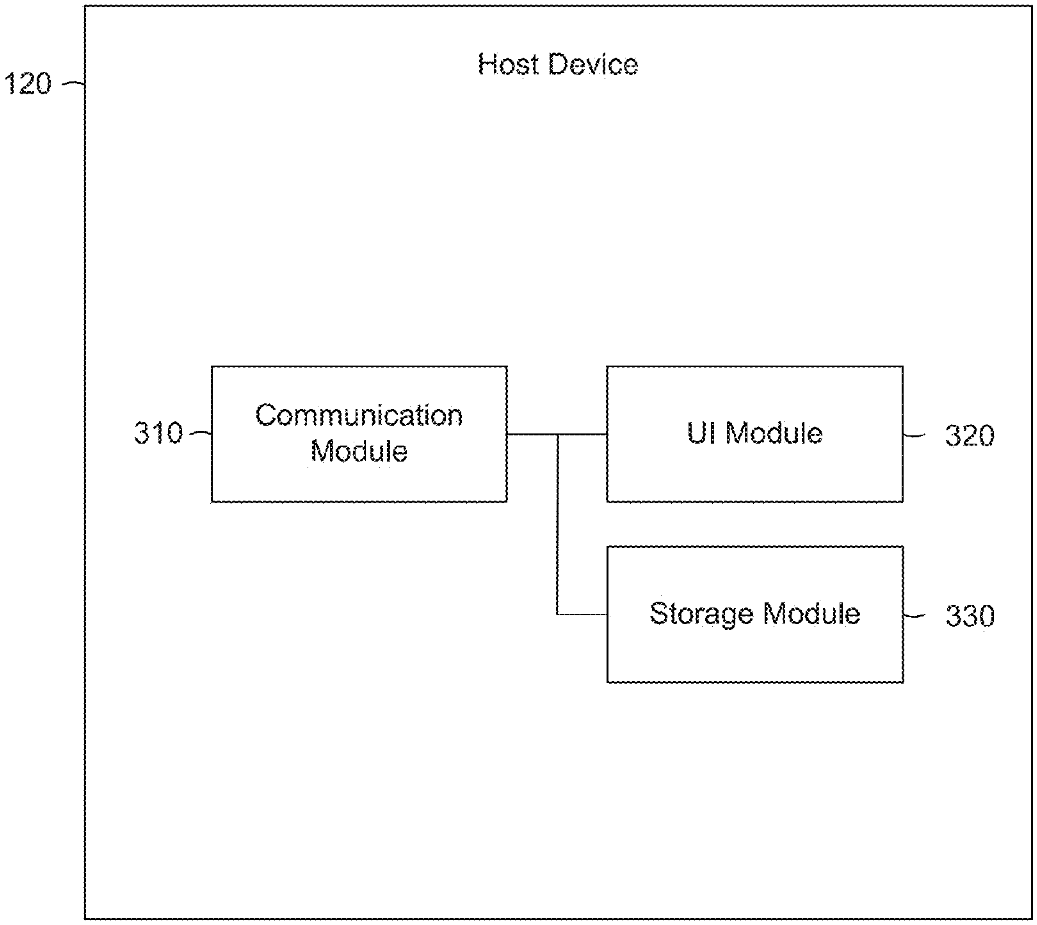
FIG. 3 is a block diagram illustrating a host device for view debugging, according to an example embodiment.

FIG. 3 is a block diagram illustrating modules 310-330 of a host device 120 suitable for visual debugging, according to an example embodiment. The host device 120 is shown as including a communication module 310, a UI module 320, and a storage module 330, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 can send data to and receive commands from the development machine 110. For example, the application developer using the development machine 110 may want to single-step through an application running on the host device 120. Accordingly, the development machine 110 may send commands to the host device 120 to execute the set of instructions corresponding to a single line of code in the application being debugged. Similarly, the development machine 110 may request data regarding the state of the application being debugged (e.g., values in memory, data stored in data structures, results of OS calls, and so on). The communication module 310 can send responses to such requests to the development machine 110.

The UI module 320 can cause a UI to be presented on the host device 120. Typically, the application being debugged has own user interface, distinct from the UI of the visual debugger. For example, the application being debugged may be a text-editing application that includes a menu bar, a text entry area, pop-up windows, and so on. During visual debugging, the visual debugger may show information regarding the text-editing application while the UI of the text-editing application itself is shown on a screen of the host device 120. In some example embodiments, the host device 120 is the development machine 110. In these example embodiments, the UI of the application may be shown on a separate display device (e.g., a second monitor), in a separate application window (e.g., by running as a separate application from the visual debugger), or in a window of the visual debugger (e.g., by being executed by an interpreter of the debugger).

The storage module 330 may store information for use by the application being debugged, by the visual debugger, or both. For example, the text-editing application discussed above may store text and formatting data that are not currently being displayed. As another example, the visual debugger may access data stored in the storage module 330 to modify certain values to provoke particular behavior in the application being debugged. For example, variables may be modified to test particular conditions in which errors are likely to occur (e.g., out-of-memory errors, stack overflow errors, and boundary condition errors).

Example User Interface Screens

Figure 4:
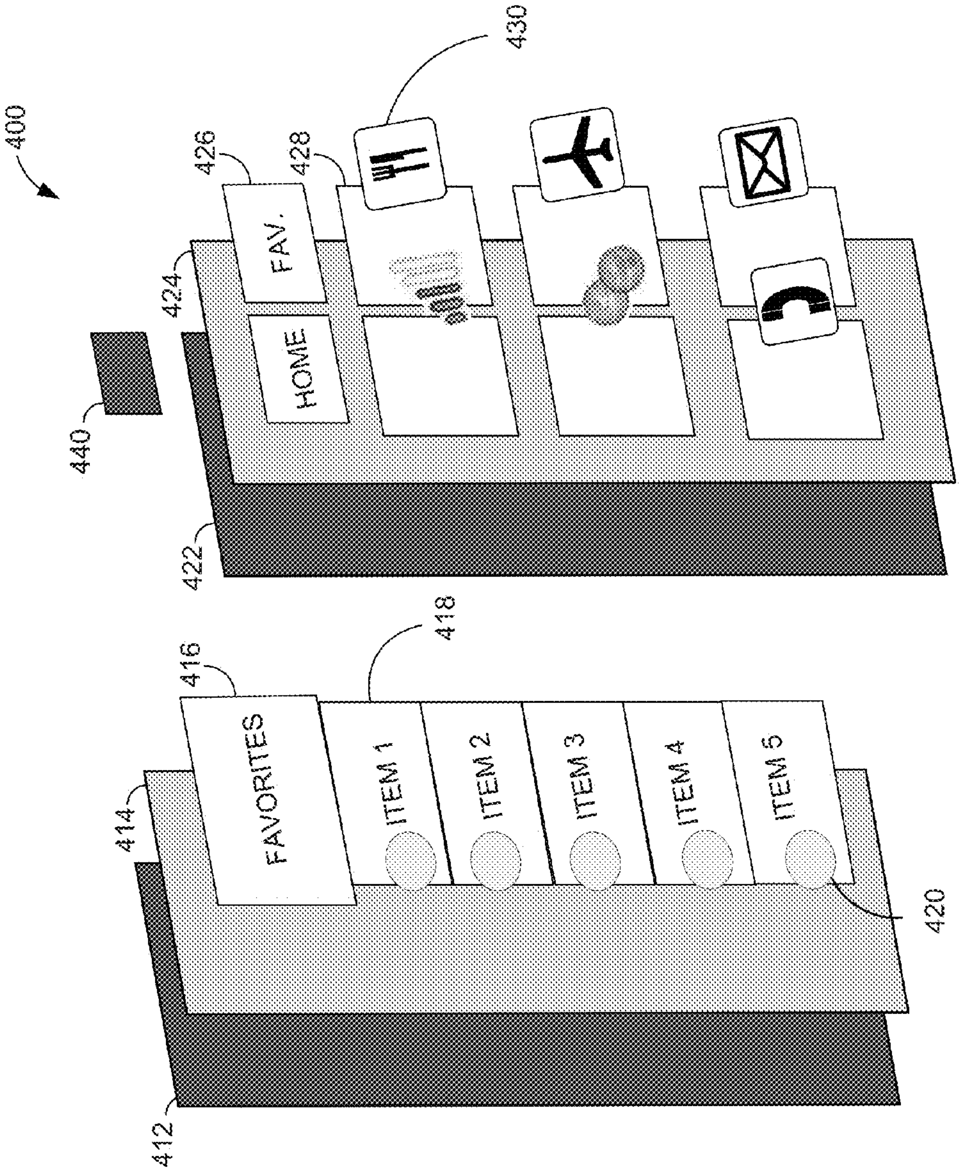
FIGS. 4-8 are block diagrams illustrating user interfaces suitable for view debugging, according to some example embodiments.

FIG. 4 is a block diagram 400 illustrating a user interface suitable for visual debugging, according to some example embodiments. The user interface of block diagram 400 may be suitable for presentation to an application developer (e.g., a user of the development machine 110). As can be seen in block diagram 400, the user interface includes layers 412, 414, 422, and 424 and user interface elements 416, 418, 420, 426, 428, 430, and 440. Each user interface element 416-420 and 426-440 corresponds to an object in the view hierarchy of the UI of the application being debugged.

The 3D UI of FIG. 4 includes a plurality of objects that are disposed on a canvas or work area, and arranged in parallel layers. A first layer 412, in the depicted example, includes a background plane for a favorites menu. The favorites menu may include a foreground color disposed in a second layer 414. On top of, or in front of, the second layer 414 is a third layer that includes a title bar 416 and a plurality of text boxes 418. A fourth layer includes a plurality of buttons 420 that are arranged in line with the plurality of text boxes 418 in the third layer. The plurality of buttons 420 are offset from text boxes 418 by their location in the fourth layer.

A fifth layer 422 includes a background plane for a home menu. The fifth layer 422 may be disposed in front of the first through fourth layers, and optionally, separated by space where additional layers could be inserted. The home menu may include a foreground color in a sixth layer 424. On top of the sixth layer 424 is a seventh layer that includes a menu 426 and a plurality of selection buttons 428. An eighth layer includes a plurality of icons 430 that correspond with each one of the selection buttons 428 and are disposed above, or in front of, the respective selection buttons 428.

The layers 412 and 422 each correspond to a view of the application being debugged. The user interface elements 416, 418, and 420 are child elements of the view represented by the layer 412. The UI elements 426, 428, and 430 are child elements of the view represented by the layer 422. The UI element 440 is a child element of the view represented by the layer 412. Unlike the other UI elements shown, however, if a projection of the view represented by the layer 412 is taken through its children, the UI element 440 falls outside of that projection, while the UI elements 416, 418, and 420 fall inside of that projection.

Figure 5:
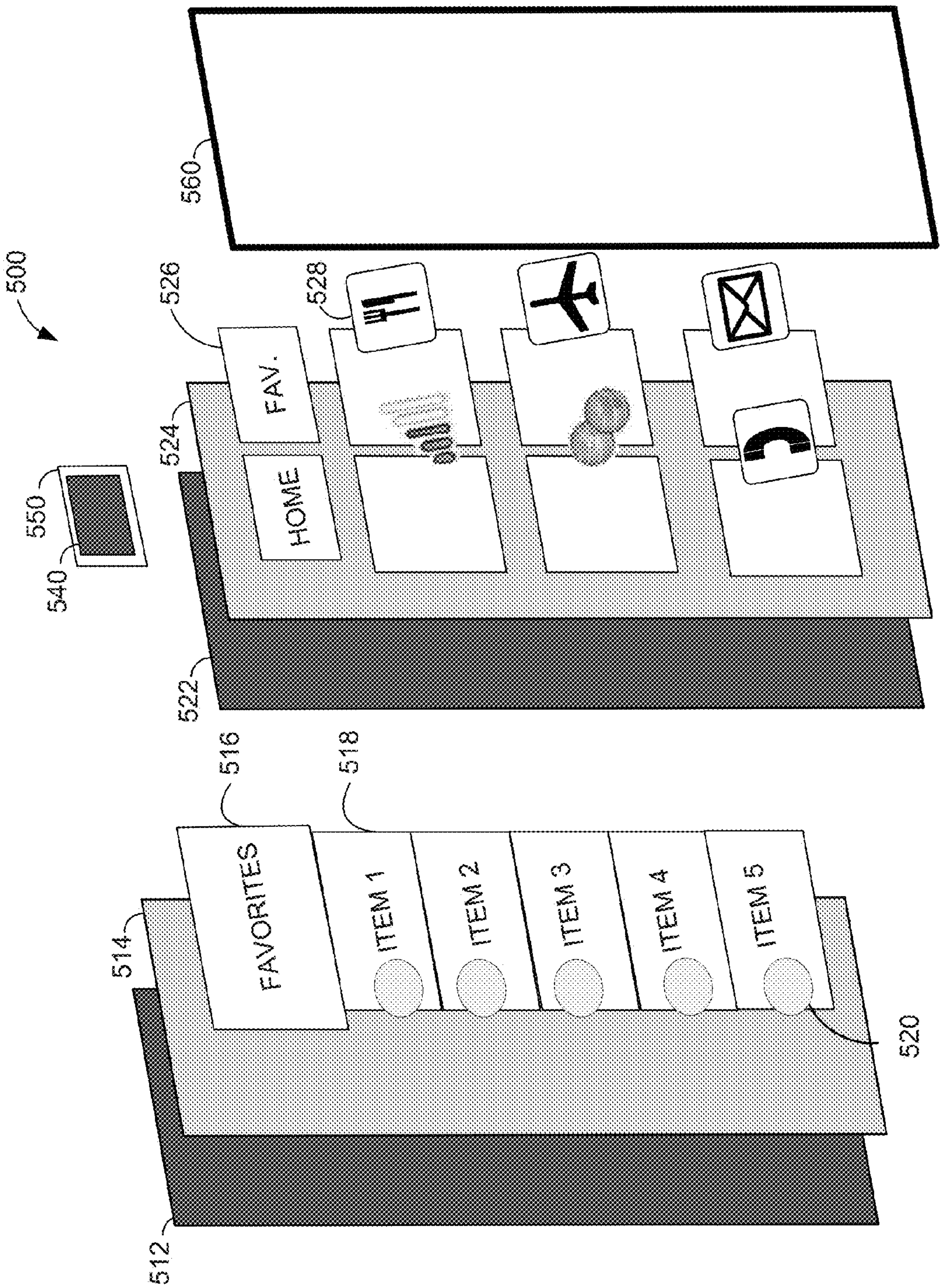

FIG. 5 is a block diagram 500 illustrating a user interface suitable for visual debugging, according to some example embodiments. The user interface of block diagram 500 may be suitable for presentation to an application developer (e.g., a user of the development machine 110). The UI of block diagram 500 may be shown to an application developer after the UI of block diagram 400 in response to a selection by the application developer to show the display boundaries for the application being debugged. As can be seen in block diagram 500, the user interface includes layers 512, 514, 522, and 524 and user interface elements 516, 518, 520, 526, 528, 540, 550, and 560. Each user interface element 416-420 and 426-440 corresponds to an object in the view hierarchy of the UI of the application being debugged. The user interface elements 550 and 560 are provided by the visual debugger to aid the application developer.

The layers 512 and 514 correspond to the layers 412 and 414 described above with respect to FIG. 4. The layers 522 and 524 correspond to the layers 422 and 424 described above with respect to FIG. 4. The UI elements 516, 518, 520, 526, 528, 530, and 540 correspond to the UI elements 416, 418, 420, 426, 428, 430, and 440 described above with respect to FIG. 4.

The user interface element 550 provides a visual indication to the application developer that the UI element 540 is outside the bounds of the display for the application. In this case, the visual indication is an outline. In some example embodiments, a color, brightness, opacity, thickness, or other visual attribute of the UI element 540 is changed to indicate that the UI element 540 is out of bounds. For example, instead of presenting the UI element 540 as a two-dimensional object on its layer, the UI element 540 may be expanded to be thicker than other, in-bounds, elements. In some example embodiments, the three-dimensional expansion of the UI can be rotated by the developer. In these embodiments, thicker elements will appear larger than other elements when the view is rotated such that the elements are seen edge-on. Accordingly, a developer may find the out-of-bounds elements easier to see. Two or more visual indicators may also be used. For example, changing the brightness and thickness may provide distinct visual indicators that together further improve the ability of a developer to identify the out-of-bounds elements from different views.

The user interface element 560 provides a visual indication of the display boundary of the application. In this case, the visual indication is an outline shown on the right-most layer of the display. Other visual indicators may also be used. For example, a hollow rectangular tube traversing all layers may be shown.

Figure 6:
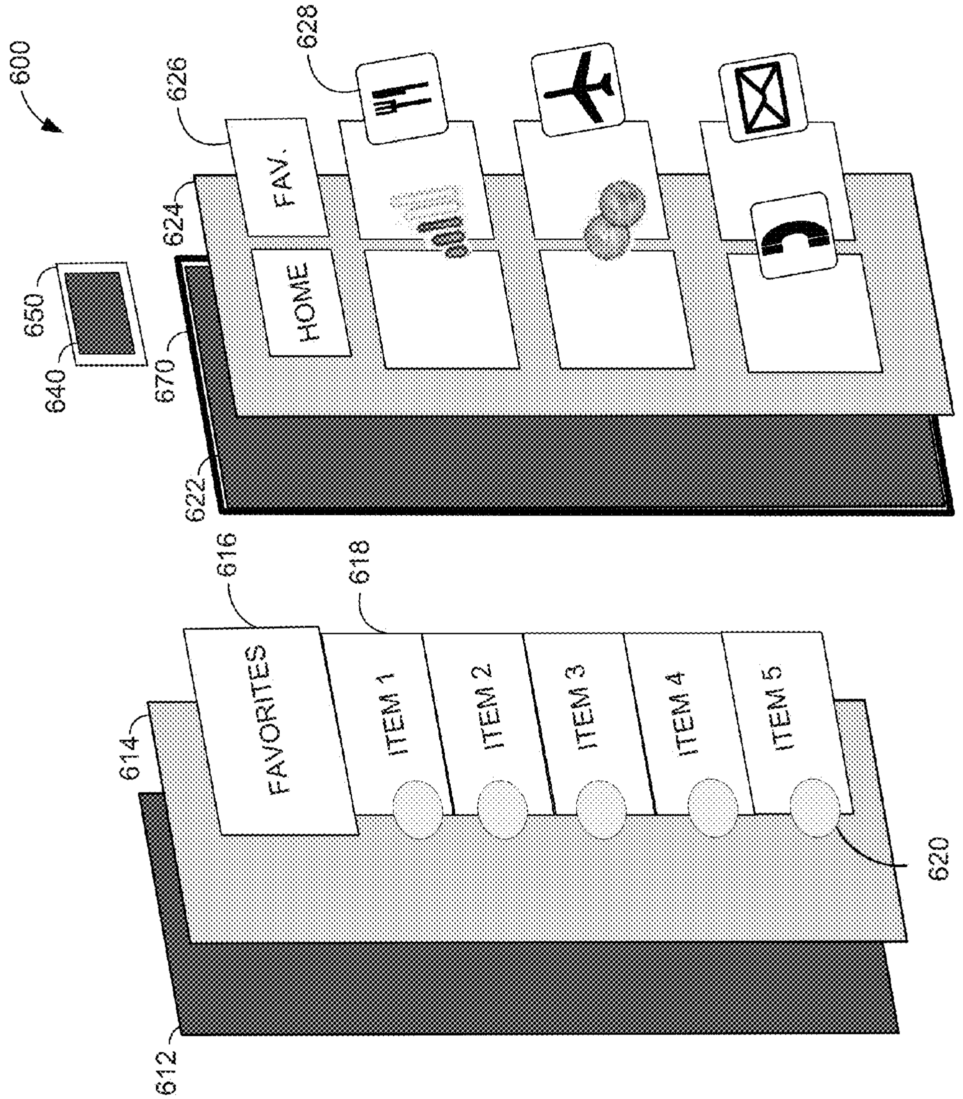

FIG. 6 is a block diagram 600 illustrating a user interface suitable for visual debugging, according to some example embodiments. The user interface of block diagram 600 may be suitable for presentation to an application developer (e.g., a user of the development machine 110). The UI of block diagram 600 may be shown to an application developer after the UI of block diagram 500 in response to a selection by the application developer to show the display boundaries for the application being debugged on a selected layer. Alternatively or additionally, the UI of block diagram 600 may be shown automatically, based on the detection of the UI element 640 being outside the boundary. As can be seen in block diagram 600, the user interface includes layers 612, 614, 622, and 624 and user interface elements 616, 618, 620, 626, 628, 640, 650, and 670. Each user interface element 616-620 and 626-640 corresponds to an object in the view hierarchy of the UI of the application being debugged. The user interface elements 650 and 670 are provided by the visual debugger to aid the application developer.

The layers 612 and 614 correspond to the layers 412 and 414 described above with respect to FIG. 4. The layers 622 and 624 correspond to the layers 412 and 414 described above with respect to FIG. 4. The UI elements 616, 618, 620, 626, 628, 630, and 640 correspond to the UI elements 416, 418, 420, 426, 428, 430, and 440 described above with respect to FIG. 4.

The user interface element 650 provides a visual indication to the application developer that the UI element 640 is outside the bounds of the display for the application. The visual indication 650 may be the same as or different from the visual indication 550. For example, the visual indication

550 may be a thin red outline and the visual indication 650 may be a thick red outline. In some example embodiments, a color, brightness, opacity, or other visual attribute of the UI element 640 is changed to indicate that the UI element 640 is out of bounds. Likewise, in some example embodiments, a color, brightness, opacity, or other visual attribute of the UI element 550 is changed to create the UI element 650, to indicate that the UI element 640 is out of bounds and on the selected layer, as discussed below with respect to the UI element 670.

The user interface element 670 provides a visual indication of the display boundary of the application. The UI element 670 may be the same as the UI element 560, except moved from the position shown in FIG. 5 to the position shown in FIG. 6. The layer on which the display boundary is shown may be referred to as the selected or active layer. In this case, the visual indication 670 is an outline shown on the active layer of the display. In some example embodiments, elements of the UI that are on the layer are individually outlined. In other example embodiments, the entire display region is outlined, as shown in FIG. 6. The color and other visual properties of the UI element 670 may be the same as or different from the corresponding properties of the UI element 560. For example, the boundary shown by the UI element 670 may be green and the outline shown by the UI element 560 may be red.

Figure 7:
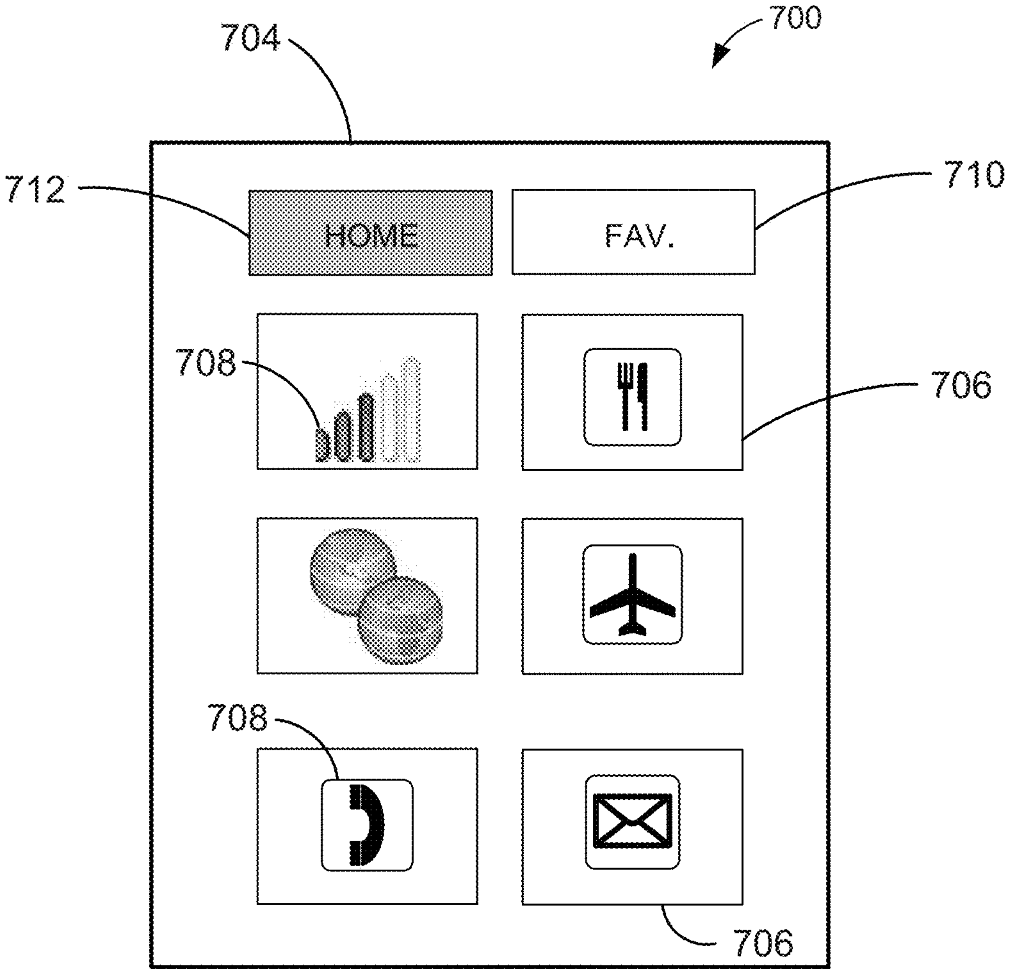

FIG. 7 is a block diagram 700 illustrating a user interface suitable for visual debugging, according to some example embodiments. The user interface of block diagram 700 may be suitable for presentation to an application developer (e.g., a user of the development machine 110) or to an application user (e.g., a user of the host device 120). The UI of block diagram 700 may be shown to an application developer in response to a selection by the application developer to view the two-dimensional application UI as it will appear to a user. As can be seen in block diagram 700, the user interface includes user interface elements 704, 706, 708, 710, and 712. The UI element 704 corresponds to the view represented by the layer 424, as described above with respect to FIG. 4. The UI elements 710 and 712 correspond to the UI elements 426, as described above with respect to FIG. 4. Similarly, the UI elements 706 correspond to the UI elements 428 and the UI elements 708 correspond to the UI elements 430.

In this user interface, the UI element 710 may be operable to switch views, causing the view corresponding to the layer 414 to be shown and the view corresponding to the layer 424 (shown in FIG. 7) to be hidden. The color of the UI element 712, labeled "home" may be altered to indicate that the present view is the home view. Alternatively, another visual indication may be used.

Figure 8:
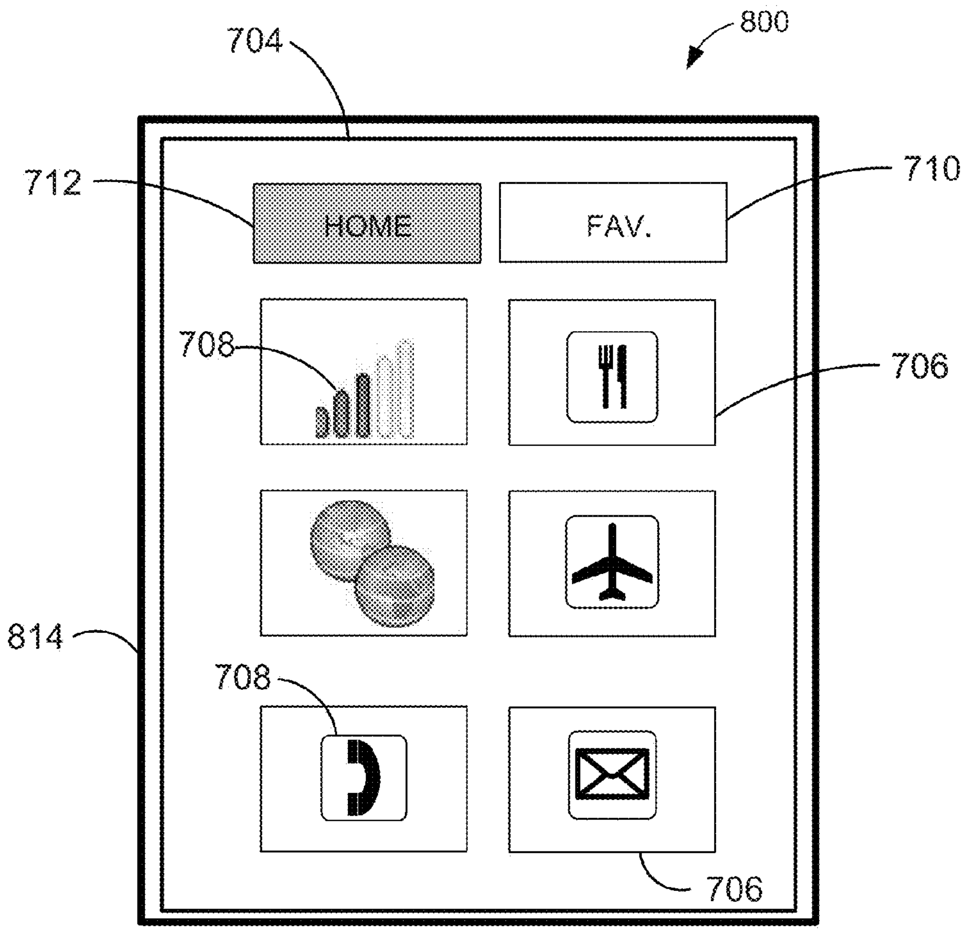

FIG. 8 is a block diagram 800 illustrating a user interface suitable for visual debugging, according to some example embodiments. The user interface of block diagram 800 may be suitable for presentation to an application developer (e.g., a user of the development machine 110). The UI of block diagram 800 may be shown to an application developer in response to a selection by the application developer to view the two-dimensional application UI as it will appear to a user, along with the display boundary for the application. As can be seen in block diagram 800, the user interface includes user interface elements 704, 706, 708, 710, 712, and 814. The UI elements 704, 706, 708, 710, and 712 are described above, with respect to FIG. 7. The UI element 814 shows the display boundary for the user interface, and corresponds to the element 670 of FIG. 6, shown in a two-dimensional view.

Example Methods

Though arranged serially in the examples of FIGS. 9-12, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Figure 9:
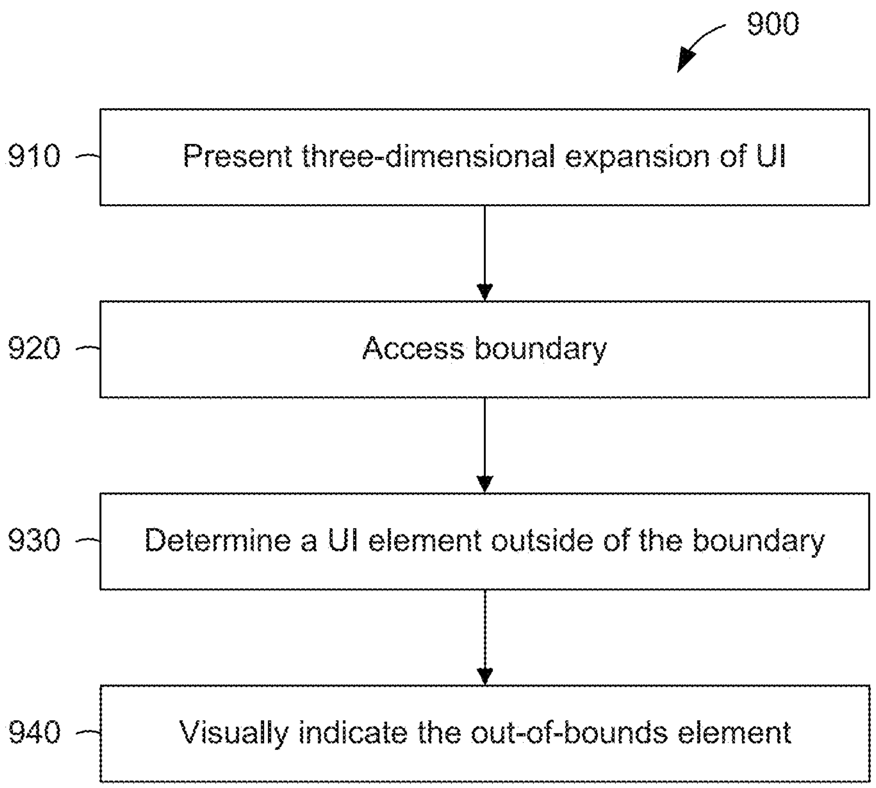
FIGS. 9-12 are flowcharts illustrating methods for view debugging, according to example embodiments.

FIG. 9 is a flowchart illustrating operations of a development machine 110 in performing methods of visual debugging, according to some example embodiments. In an example, operations in the method 900 may be performed by the development machine 110, using modules described above with respect to FIG. 2. As shown in FIG. 9, the method 900 includes operations such as presenting a three-dimensional expansion of a UI at 910, accessing a boundary at 920, determining a UI element outside of the boundary at 930, and visually indicating the out-of-bounds element at 940.

In the operation 910, the display module 220 displays a three-dimensional expansion of a UI of an application. For example, an application may have a two-dimensional UI similar to that shown in FIG. 7. The three-dimensional expansion of the UI may be similar to that shown in FIG. 4.

In the operation 920, the boundary module 230 accesses a boundary for the UI of the application. For example, an application may run on a mobile device with a display size of 640×960 pixels and have access to the full screen of the device. Accordingly, the boundaries for this example application are x=0, y=0, x=639, and y=959. As another example, an application may run in a window on a desktop computer. The application may define its window size to be 300×200 pixels. Accordingly, the boundaries for this example application are x=0, y=0, x=299, and y=199. The boundary module 230 may access the boundary via communication with the application, by retrieval from a database or configuration file, or in some other way.

In the operation 930, the boundary module 230 determines a UI element that is at least partially outside of the boundary. For example, each two-dimensional UI element may be associated with a data structure that includes the (x,y) position of a corner of the element and the width and height of the element. From this data structure, the left, right, top, and bottom edges of the UI element can be calculated. The edges of the UI element are compared to the boundaries for the application to determine whether or not the UI element is inside, outside, or overlapping with the boundary.

In the operation 940, the display module 220 visually indicates the UI element that is at least partially out of bounds. For example, the color of the UI element may be changed. In some example embodiments, a first color is used when the UI element is entirely within bounds, a second color is used when the UI element overlaps with the boundary, and a third color is used when the UI element is entirely out of bounds. In other example embodiments, a border or highlight is added to the UI element.

Figure 10:
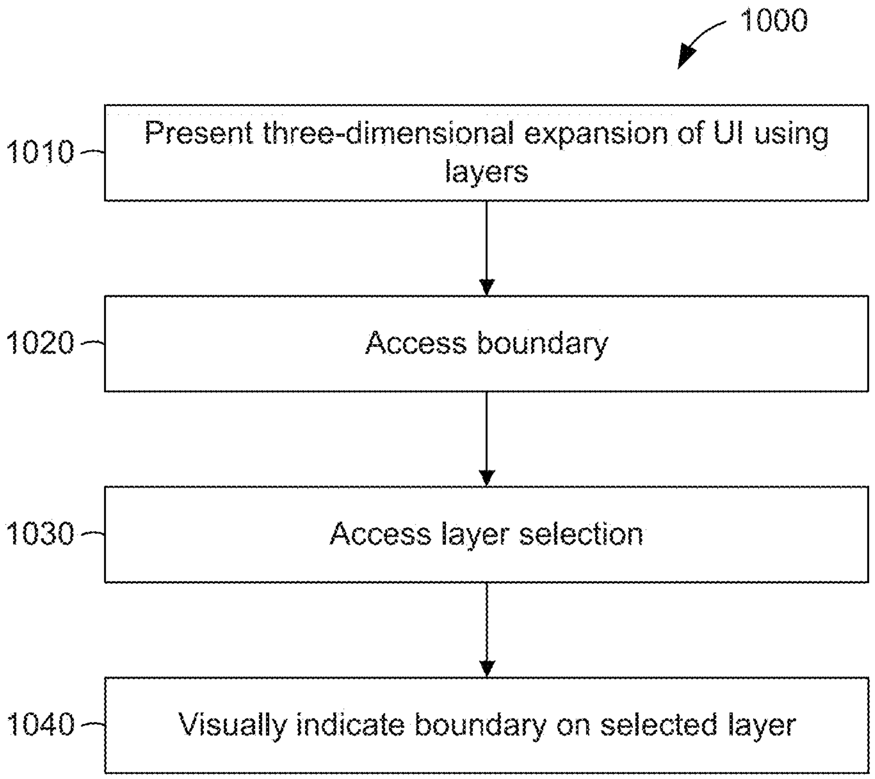

FIG. 10 is a flowchart illustrating operations of a development machine 110 in performing methods of visual debugging, according to some example embodiments. In an example, operations in the method 1000 may be performed by the development machine 110, using modules described above with respect to FIG. 2. As shown in FIG. 10, the method 1000 includes operations such as presenting a three-dimensional expansion of a UI at 1010, accessing a boundary at 1020, accessing a layer selection at 1030, and visually indicating the boundary on the selected layer at 1040.

In the operation 1010, the display module 220 displays a three-dimensional expansion of a UI of an application using layers. For example, an application may have a two-dimensional UI similar to that shown in FIG. 7. The three-dimensional expansion of the UI may be similar to that shown in FIG. 4. Each element of the three-dimensional expansion of the UI may be assigned to a layer. For example, the element 412 of FIG. 4 is on one layer, the element 414 of FIG. 4 is on another layer, and the elements 416 and 418 are on a third layer. The Scene Kit Objective-C framework may be used to generate the three-dimensional expansion of the UI.

In the operation 1020, the boundary module 230 accesses a boundary for the UI of the application. This may be performed as described above with respect to the operation 920 of FIG. 9.

In the operation 1030, the display module 220 accesses a layer selection. For example, the UI module 240 may receive a selection of a layer displayed in the application development UI and communicate the selection to the display module 220. As another example, the display module 220 may access an automatically generated layer selection. For example, the boundary module 230 may detect a UI element that is at least partially out of bounds and automatically select the layer on which that UI element is displayed.

In the operation 1040, the display module 220 visually indicates the boundary on the selected layer. For example, the UI of FIG. 6 may be shown, wherein the boundary 670 is shown on the layer 622. Elements on the layer that are outside of the boundary 670 may be presented with an additional visual indication to show that they are out of bounds. The boundary 670 may be shown in a number of different ways. For example, a rectangle made of solid lines may be shown, as in FIG. 6. As another example, a translucent solid may be rendered that contains the layer. For example, if the boundaries are a two-dimensional rectangle 240 by 320 pixels in size, a translucent green rectangular solid with dimensions 240×320×10 may be generated and displayed.

Figure 11:
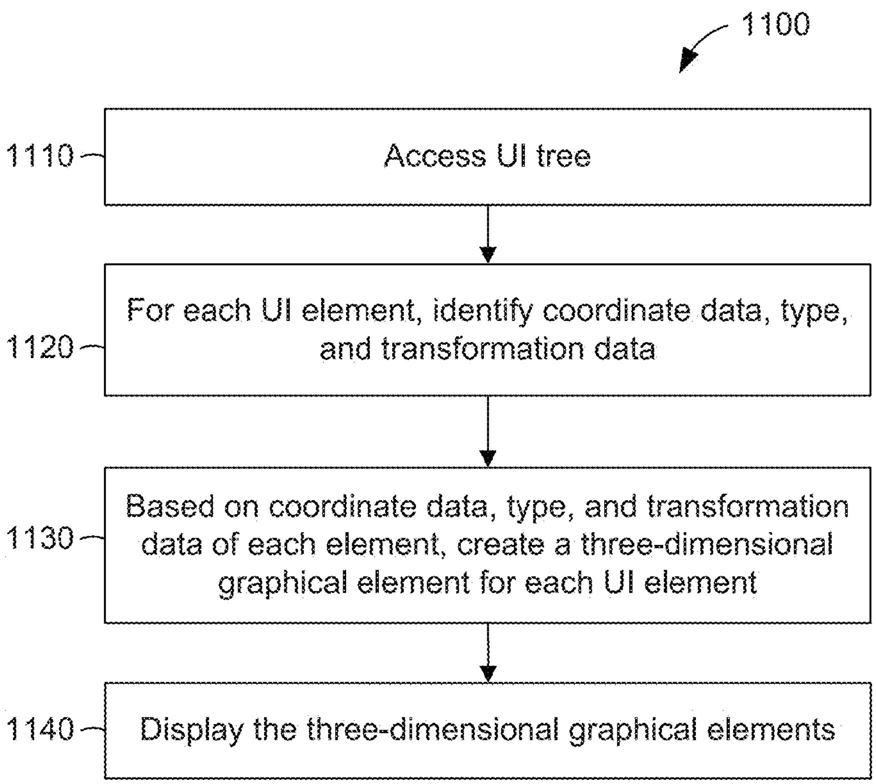

FIG. 11 is a flowchart illustrating operations of a development machine 110 in performing methods of visual debugging, according to some example embodiments. In an example, operations in the method 1100 may be performed by the development machine 110, using modules described above with respect to FIG. 2. As shown in FIG. 11, the method 1100 includes operations such as accessing a UI tree at 1110, identifying attributes of the elements in the UI tree at 1120, creating a three-dimensional graphical element for each element in the UI tree at 1130, and displaying the three-dimensional graphical elements at 1140.

In the operation 1110, a UI tree is accessed. For example, the user interface of the target application 140 running on the host device 120 may be implemented using a UI tree. The tree may be made up of a root node having child nodes, each of which may have child nodes of their own, and so on. The root node may be a window. The child nodes may be views, containers, tabs, buttons 428, text boxes 418, sliders, combo boxes, radio buttons, check boxes, and so on. The target application 140 may be frozen or halted while its UI is being accessed. In some example embodiments, the target application 140 remains frozen until the developer issues a command to the debugging application 130 to allow the target application 140 to continue.

In the operation 1120, attributes of the UI elements in the UI tree are accessed. For example, coordinate data (e.g., position and size), type (e.g., view, container, button, etc.), and transformation data (e.g., rotation, translation, scaling) may be accessed. Visibility (e.g., whether an element is visible or invisibility) may also be accessed.

In the operation 1130, a 3D graphical representation of the UI elements is generated based on at least a portion of the attribute data. For example, the size, shape, and position of the graphical representation may be based on the coordinate and transformation data. The appearance may be based on the type data. For example, a generic image for a button may be used for every element of type button. As another example, additional data regarding the UI element may be accessed in the operation 1120 and the generated image may more closely reflect the appearance of the UI element in the application being debugged. As another example, the appearance of the three-dimensional representation may be changed when the two-dimensional UI element is not visible (e.g., is obscured by another element or is configured to be invisible or fully transparent).

In the operation 1140, some or all of the three-dimensional graphical elements generated in the operation 1130 are displayed. For example, a display such as that shown in FIG. 4 may be generated. In various embodiments, more or fewer of the elements are shown. For example, a user may select an element for display while in a "descendant" mode. In response to the user's selection, the graphical representation of the selected element and its descendants may be shown while other elements are hidden. As another example, a user may select another element for display while in an "ancestor" mode. In response to the user's selection, the graphical representation of the selected elements and its lineal ancestors may be shown while other elements are hidden. In some example embodiments, the lineal ancestors are shown up to the root node. In other example embodiments, a different top-level node is chosen (e.g., the view node).

Figure 12:
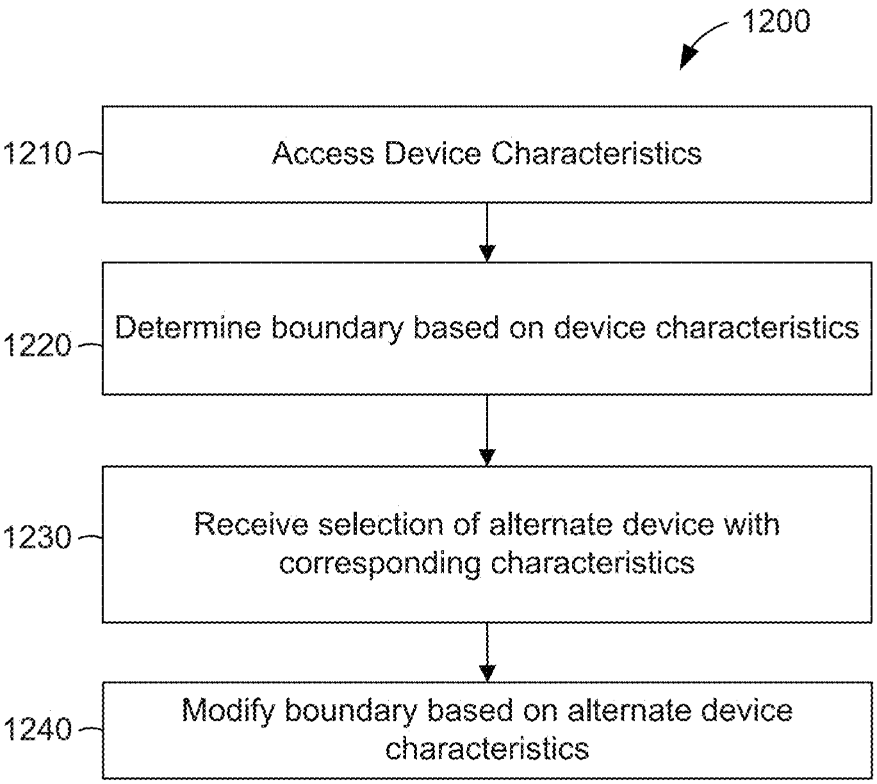

FIG. 12 is a flowchart illustrating operations of a development machine 110 in performing methods of visual debugging, according to some example embodiments. In an example, operations in the method 1200 may be performed by the development machine 110, using modules described above with respect to FIG. 2. As shown in FIG. 12, the method 1200 includes operations such as accessing device characteristics at 1210, determining a boundary 670 based on the device characteristics at 1220, receiving a selection of an alternate device at 1230, and modifying the boundary 670 based on characteristics of the alternate device at 1240.

In the operation 1210, the boundary module 230 accesses device characteristics. For example, the application developer may be developing an application intended to run on an iPhone 4. In this example, the iPhone 4 is the target platform for the application. A configuration file may be stored by the storage module 250 for the iPhone 4. The configuration file may include characteristics of the iPhone 4, including a display resolution or size.

In the operation 1220, the boundary module 230 determines a boundary 670 based on the device characteristics. For example, the device characteristics may directly define the display boundary 670. As another example, the application being debugged may be configured to occupy a percentage of the display area. In this example, the boundary 670 for the application can be calculated based on the device characteristics and the application configuration.

In the operation 1230, the UI module 240 receives a selection of an alternate device. The alternate device has corresponding characteristics. For example, the application developer may select an iPhone 5 from a drop-down list providing a list of valid target platforms for which the application can be developed. The storage module 250 may have a configuration file for the iPhone 5, with a different display size than the iPhone 4.

In the operation 1240, the boundary module 230 determines a modified boundary 670 based on the alternate device characteristics. For example, the iPhone 5 may have a larger display area than the iPhone 4. In this example, the area within the modified boundary 670 would be larger after the operation 1240 than before.

The operations of the method 1200 may be integrated with the operations of the methods 900 and 1000. For example, the boundaries accessed in the operations 920 and 1020 may be the boundaries generated in the operation 1220 or 1240.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term “hardware module” should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a “cloud computing” environment or as a “software as a service” (SaaS). For example, at least some of the operations may be performed by a group of computers (as examples of machines including processors), with these operations being accessible via a network 100 (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 100.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network 100. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
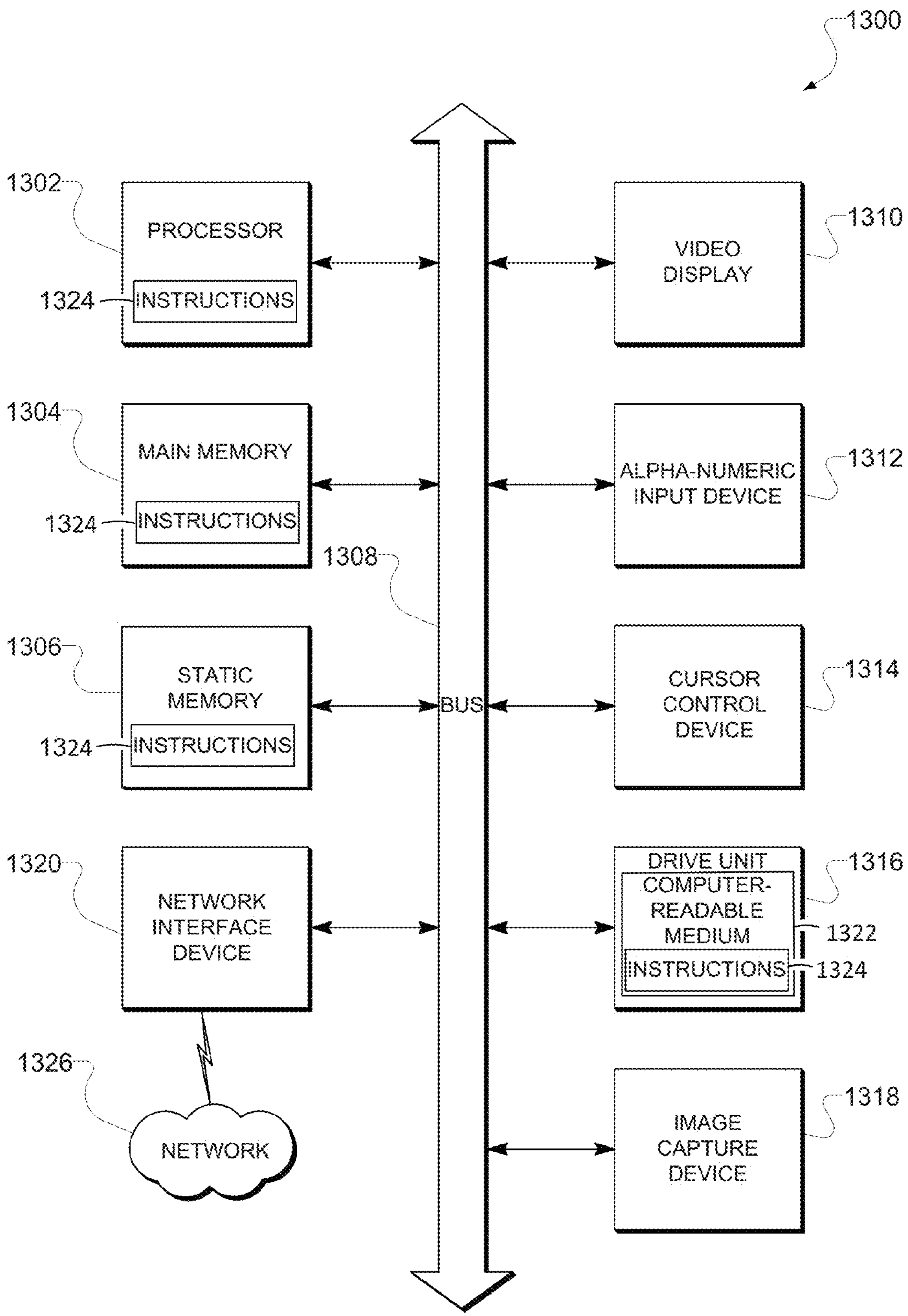
FIG. 13 is a diagrammatic representation of a machine in the example form of a computer system within which a set of instructions for causing the machine to perform any one or more of the methodologies discussed herein may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, an image capture device 1318 (e.g., a camera), and a network interface device 1320.

Machine-Readable Medium

The disk drive unit 1316 includes a machine-readable medium 1322 on which is stored one or more sets of instructions and data structures (e.g., software) 1324 embodying or used by any one or more of the methodologies or functions described herein. The instructions 1324 may also reside, completely or at least partially, within the main memory 1304, static memory 1306, and/or within the processor 1302 during execution thereof by the computer system 1300, the main memory 1304, static memory 1306 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term “invention” merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated. In the appended claims, the terms “including” and “in which” are used as the plain-English equivalents of the respective terms “comprising” and “wherein.” Also, in the following claims, the terms “including” and “comprising” are open-ended; that is, a system, device, article, or process that includes elements in addition to those listed after such a term in a claim are still deemed to fall within the scope of that claim. Moreover, in the following claims, the terms “first,” “second,” and “third,” and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

generating a three-dimensional representation of a set of two-dimensional graphical elements to be output to a display device, each of the graphical elements representing a corresponding user interface element of a set of user interface elements, wherein the graphical elements are presented on a plurality of layers;

accessing a boundary corresponding to display bounds of a target device;

determining a user interface element of the set of user interface elements that is at least partially outside the boundary;

automatically selecting, from the plurality of layers, a layer of the determined out-of-bounds graphical element; and causing a visual indication to be presented with respect to the layer of the three-dimensional representation, the visual indication indicating the graphical element corresponding to the determined out-of-bounds user interface element.

2. The method of claim 1, wherein the set of user interface elements include a hierarchy of child elements and each of the plurality of layers is associated with a level of the hierarchy of child elements.

3. The method of claim 1, wherein the visual indication is a visual indication of the boundary, with respect to the layer, of the determined out-of-bounds graphical element.

4. The method of claim 2, further comprising:

receiving a selection of a layer of the plurality of layers; and causing a visual indication of the boundary to be presented with respect to the layer.

5. The method of claim 4, wherein the receiving of the selection of the layer includes receiving a user input of dragging the boundary.

6. The method of claim 4, wherein the visual indication indicating the graphical element and the visual indication indicating the boundary each have a color.

7. The method of claim 6, wherein the color of each of the visual indications is a same color.

8. The method of claim 6, wherein the color of the visual indication indicating the graphical element is a different color than the color of the visual indication indicating the boundary.

9. The method of claim 1, wherein the boundary corresponds to display bounds of an application.

10. The method of claim 9, wherein the display bounds of the application are based on a target platform.

11. The method of claim 10, further comprising:

receiving a selection of a different target platform; and modifying the boundary to reflect the different target platform.

12. The method of claim 1, further comprising generating each graphical element of the set of graphical elements from the corresponding user interface element based on coordinate data for the user interface element, a type of the user interface element, and transformation data for the user interface element.

13. The method of claim 1, wherein the user interface elements are derived from a frozen application.

14. The method of claim 1, wherein the visual indication includes an outline.

15. The method of claim 1, wherein the visual indication includes an altered thickness of the three-dimensional representation.

16. A system comprising:

a memory;

a display module coupled to the memory and configured to generate a three-dimensional representation of a set of two-dimensional graphical elements to be output to a display device, each of the graphical elements representing a corresponding user interface element of a set of user interface elements, wherein the graphical elements are presented on a plurality of layers;

a boundary module coupled to the memory and configured to:

access a boundary corresponding to display bounds of a target device;

determine a user interface element of the set of user interface elements that is at least partially outside the boundary; and automatically select, from the plurality of layers, a layer of the determined out-of-bounds graphical element; and wherein:

the display module is further configured to cause a visual indication to be presented with respect to the layer of the three-dimensional representation, the visual indication indicating the graphical element corresponding to the determined out-of-bounds user interface element.

17. The system of claim 16, wherein the boundary module and the display module are different modules.

18. The system of claim 16, wherein the set of user interface elements include a hierarchy of child elements and each of the plurality of layers is associated with a level of the hierarchy of child elements.

19. The system of claim 18, wherein the visual indication is a visual indication of the boundary, with respect to the layer, of the determined out-of-bounds graphical element.

20. A non-transitory machine-readable storage medium comprising instructions that, when executed by one or more processors of a machine, cause the machine to perform operations comprising:

generating a three-dimensional representation of a set of two-dimensional graphical elements to be output to a display device, each of the graphical elements representing a corresponding user interface element of a set of user interface elements, wherein the graphical elements are presented on a plurality of layers;

accessing a boundary corresponding to display bounds of a target device;

determining a user interface element of the set of user interface elements that is at least partially outside the boundary;

automatically selecting, from the plurality of layers, a layer of the determined out-of-bounds graphical element; and causing a visual indication to be presented with respect to the layer of the three-dimensional representation, the visual indication indicating the graphical element corresponding to the determined out-of-bounds user interface element.

21. The non-transitory machine-readable medium as in claim 20, wherein the set of user interface elements include a hierarchy of child elements and each of the plurality of layers is associated with a level of the hierarchy of child elements.

22. The non-transitory machine-readable medium as in claim 20, wherein the visual indication is a visual indication of the boundary, with respect to the layer, of the determined out-of-bounds graphical element.

* * * * *